United States Patent [19]

Kuroda

[11] Patent Number: 5,239,432
[45] Date of Patent: Aug. 24, 1993

[54] MAGNETIC TAPE CASSETTE HAVING A SLOT FOR INSERTING A RECORDING AND/OR REPRODUCING HEAD THERETHROUGH AND A MAGNETIC TAPE RECORDING AND/OR REPRODUCING APPARATUS FOR USE WITH SUCH MAGNETIC TAPE CASSETTE

[75] Inventor: Masayuki Kuroda, Kanagawa, Japan

[73] Assignee: Sony Corporation, Tokyo, Japan

[21] Appl. No.: 700,523

[22] Filed: May 14, 1991

[30] Foreign Application Priority Data

May 25, 1990 [JP] Japan .............................. 2-135992
Nov. 13, 1990 [JP] Japan .............................. 2-306771

[51] Int. Cl.⁵ .............................................. G11B 5/52
[52] U.S. Cl. ...................................... 360/107; 360/85;
360/83; 360/132; 360/134; 360/130.23
[58] Field of Search ............ 360/84, 85, 83, 107,
360/132, 134, 130.23, 130.22, 104

[56] References Cited

U.S. PATENT DOCUMENTS 4,369,473  1/1983  Eibensteiner ...................... 360/85
5,140,487  8/1992  Tanaka et al. ...................... 360/85

Primary Examiner—Paul M. Dzierzynski
Assistant Examiner—Kim-Kwok Chu
Attorney, Agent, or Firm—Alvin Sinderbrand; William S. Frommer

[57] ABSTRACT

A magnetic tape recording and/or reproducing apparatus which comprises a tape cassette mounting portion and a rotary head portion which are relatively movable toward to and separating from each other, the rotary head portion being provided with a recording/reproducing head which is adapted to project in the radial direction due to the centrifugal force of the rotation of the head, and the rotary head portion can approach relatively toward the tape cassette mounting portion on which the tape cassette is mounted, and the recording/reproducing head being projected by the centrifugal force contacts with the magnetic tape running within the tape cassette.

A tape cassette is also provided which comprises a front wall having a circular arcuate recess as viewed in the plan view, with the inner surface of a portion of the front wall defining the arcuate recess being formed as an arcuate drum surface along which the tape contacts and slides during the running condition, the portion of the front wall forming the drum surface is formed to have a head inserting slot, and the head inserting slot is adapted to receive the recording/reproducing head therethrough for contacting with the tape.

14 Claims, 10 Drawing Sheets

MAGNETIC TAPE CASSETTE HAVING A SLOT FOR INSERTING A RECORDING AND/OR REPRODUCING HEAD THERETHROUGH AND A MAGNETIC TAPE RECORDING AND/OR REPRODUCING APPARATUS FOR USE WITH SUCH MAGNETIC TAPE CASSETTE

FIELD OF THE INVENTION

This invention relates to a magnetic recording and/or reproducing apparatus and a magnetic tape cassette for use therewith.

PRIOR ART

In one prior art magnetic recording and/or reproducing apparatus utilizing a magnetic tape cassette, the tape is pulled out of the tape cassette mounted on a cassette mounting portion and conducted along a predetermined path such as around a head drum having a rotary head and the like in recording and/or reproducing.

FIG. 10 shows one example of such prior art video tape recorder (referred hereinafter as VTR) a having a tape cassette b.

Tape reels c and c' of the tape cassette b respectively engage with reel engaging shafts (not shown) of a reel mounting portion. And shown at d is a head drum having a rotary magnetic head and, at e, e . . . are guide rollers.

When the tape cassette b is mounted, a taking out guide f and loading tape guides g and g are located in a recess portion h in the tape cassette b, loading tape guides i and i are located in a recessed portion j in the tape cassette b and a capstan k is located in a recess portion l in the tape cassette b.

In starting the recording and/or reproducing operation, the taking out guide f and loading tape guides g, g, i and i are moved respectively to predetermined positions as shown in chain arrow lines in the drawing thereby the magnetic tape m is pulled out of the cassette case n to form a predetermined tape path, and a pinch roller o is pressed against a capstan k interposing therebetween the magnetic tape m. Further, a tension regulater p is pressed resiliently against the magnetic tape m.

In taking the tape cassette b out of the VTR a, the taking out guide f and loading tape guides g, g, i and i are moved respectively to the original positions or to the recesses h and j, the pinch roller o returns to the original position, and either one or both of the tape reels c and c' are rotated so as to wind the magnetic tape m into a cassette casing n.

In the prior art VTR a, it is required to provide tape loading/unloading members f, g, g, i and i for pulling or winding the magnetic tape m out of or into the cassette casing n and to actuate them respectively, thus, it is very complicated in the construction and in the circuit constitution.

Further, since the head drum d has the outer peripheral surface on which the magnetic tape m moves slidingly it is required to have a highly finished surface. And a high speed rotary member such as a rotary head is incorporated therein, thus, the construction is complicated and a high accuracy is required in machining and assembling.

Further, the members f, g, g, i and i for pulling the magnetic tape m out of the cassette casing n are required to be positioned at high accuracy to define accurately the path of the magnetic tape m, thus, the mechanism for displacing and locating such members at high accuracy is complicated and expensive.

Further, since the tape winding surfaces of the head drums and the tape pathes of respective VTRs do not coincide with each other, which will deteriorate the interchangeability thereby degenerating the quality of reproduction when the reproducing VTR differs from that of the recording.

Further, it is required to pull the magnetic tape out of the tape cassette n in recording/reproducing thereby requiring an access time or a build up time, which is inconvenient in utilizing the VTR in data processing.

SUMMARY OF THE INVENTION

An object of the invention is to eliminate above described discrepancies in prior art video tape recorder (VTR) and to provide a novel magnetic tape recording and/or reproducing apparatus which comprises: a tape cassette mounting portion and a rotary head portion being relatively movable toward to and separating from each other; with the rotary head portion being provided with a recording/reproducing head which is adapted to project in the radial direction due to the centrifugal force of the rotation thereof, whereby the rotary head portion approaches relative to the tape cassette mounting portion on which the tape cassette is mounted thereon, and the recording/reproducing head being projected by the rotation contacts with the magnetic tape which is running within the tape cassette.

Further, according to the invention, there is provided a tape cassette having a circular arcuate recess portion as seen in the plan view being formed in the front wall, with the inner surface of the front wall the arcuate recess portion being formed as an arcuate drum surface to which the magnetic tape contacts and moves slidingly, an incliningly elongated head inserting slot or groove being formed in the wall of the drum surface, whereby the recording and/or reproducing head can be inserted through the head inserting slot to contact with the magnetic tape in the tape cassette.

Accordingly, it is possible to omit, according to the invention, the complicated tape loading mechanism which pulls the tape out of the tape cassette and locates it along a predetermined path around a head drum, thereby simplifying the construction. Further, since the recording/reproducing head is not provided on the head drum on which the tape is wound thereon, the construction of the head can be simplified and the service life of the rotary head portion can be elongated. Further, the path of the magnetic tape during the recording/reproducing procedure is defined solely by the tape cassette in which the tape is received, the interchangeability is superior. And since the tape path is formed in the tape cassette the tape pulling out process can be omitted, the access time or the build up time can be minimized, and the apparatus can also be applied in data processing.

BRIEF DESCRIPTION OF THE DRAWINGS

The present invention will be more fully appreciated and understood from the following detailed description taken in conjunction with the drawings in which.

DETAILED DESCRIPTION OF PREFERRED EMBODIMENTS

Figure 1:
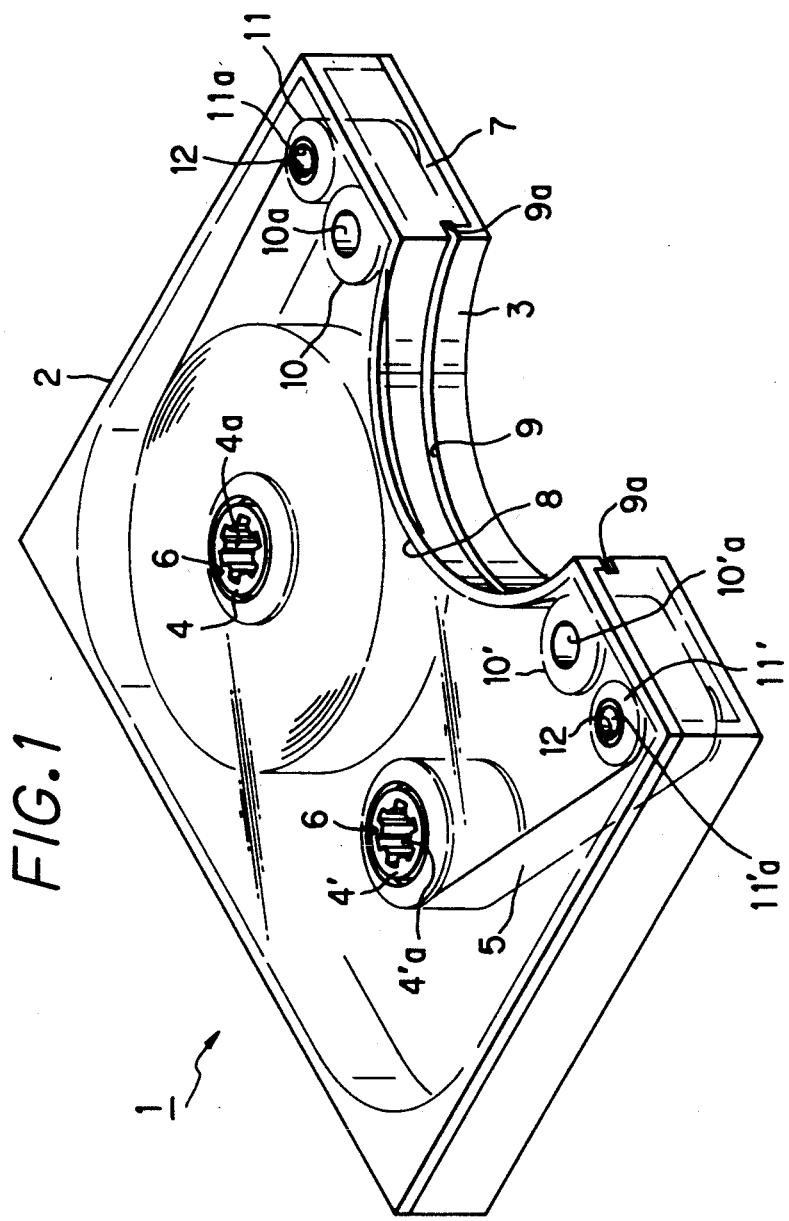
FIG. 1 is a schematic perspective view of a tape cassette according to a preferred embodiment of the present invention.

The magnetic tape recording/reproducing apparatus and the tape cassette according to the present invention will now be explained in detail with respect to a preferred embodiment shown in the drawings.

Tape Cassette (FIG. 1 through FIG. 4, FIG. 8 and FIG. 9)

Shown at 1 is a tape cassette, and at 2 is a cassette casing which has a generally flat box like, rectangular and elongated in the left and right directions as viewed in the plan view. A relatively large, circular arcuate recess 3 as viewed in the plan view is formed in the front surface of the casing 2.

Two reel hubs 4 and 4' are rotatably received in the casing 2 respectively, and a magnetic tape 5 is wound around the reel hubs 4 and 4'.

There are formed in the upper and lower walls or the walls opposing in the thickness direction of the casing 2 respective two openings 6, 6, . . . and, the reel hubs 4 and 4' having respectively engaging openings 4a and 4'a extend therethrough to expose to the outside.

Figure 2:
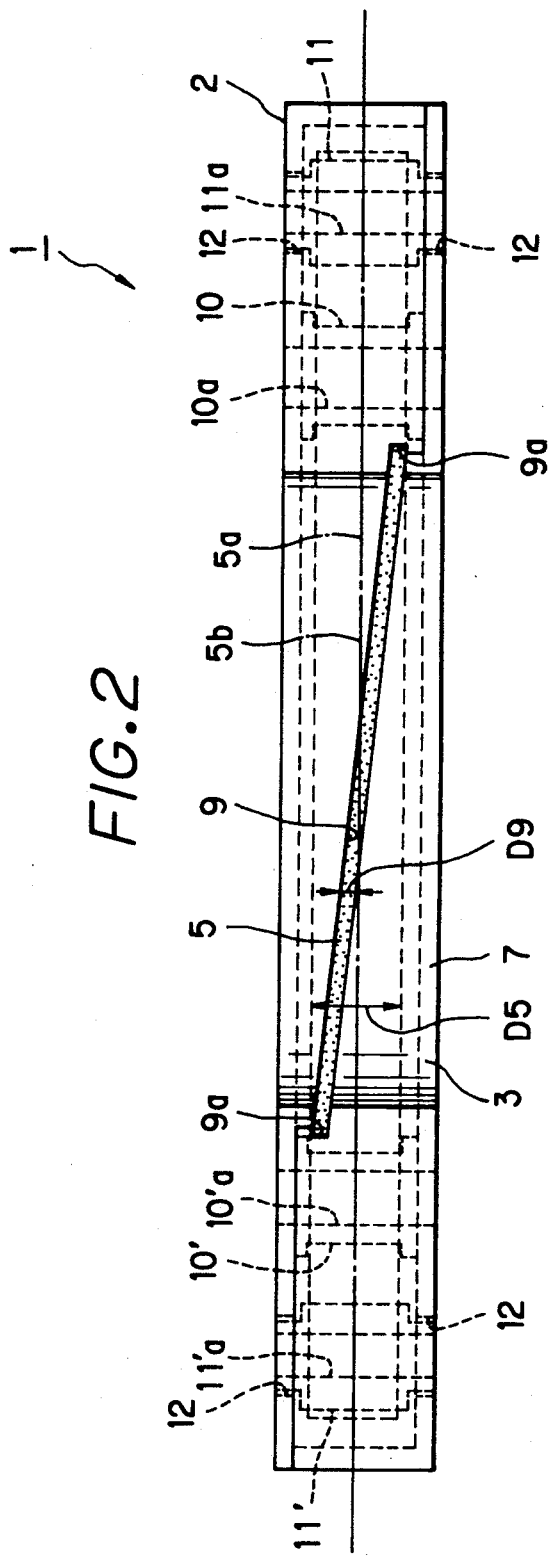
FIG. 2 is an enlarged front view of the tape cassette shown in FIG. 1.
Figure 3:
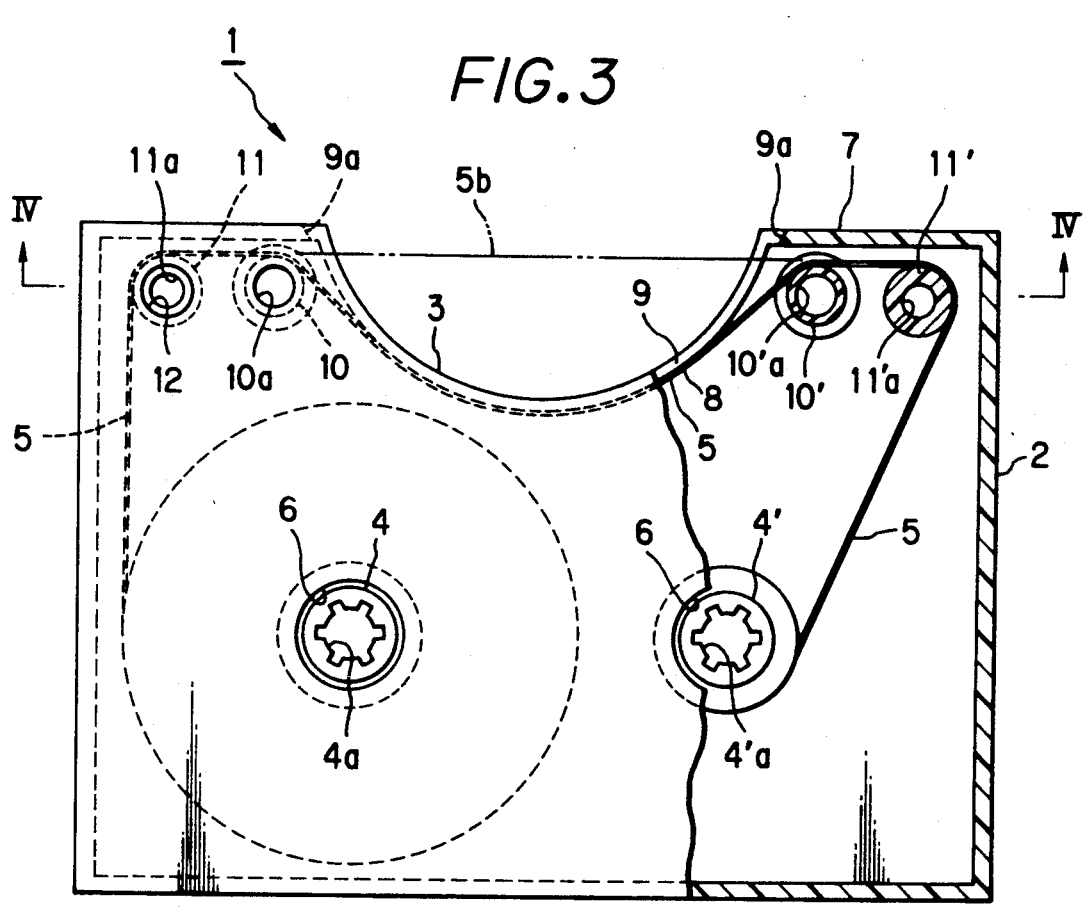
FIG. 3 is a partially broken plan view of the tape cassette shown in FIG. 1.
Figure 4:
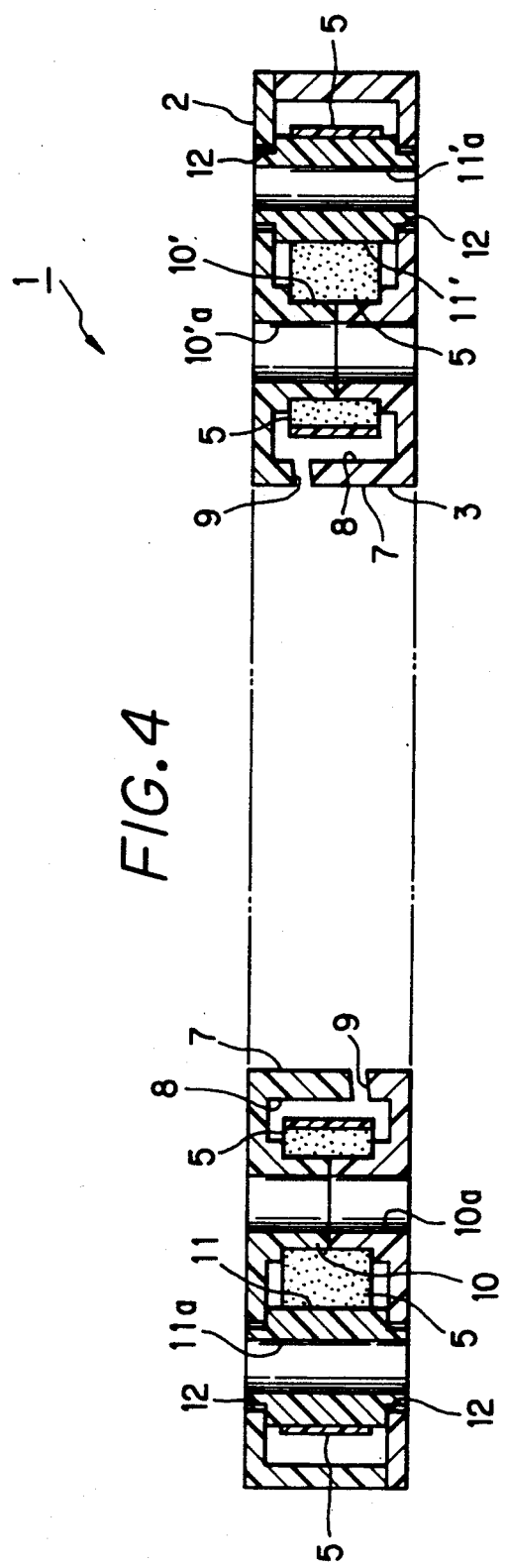
FIG. 4 is an enlarged sectional view taken generally along line IV—IV in FIG. 3.

An arcuate drum surface 8 is formed as the inner surface of a portion of the front wall 7 corresponding to the recess 3 and, a generally circular arc configuration in the plan view. Further, as shown in FIGS. 1 and 2, a head inserting groove or slot 9 is formed in the portion of the front wall 7 corresponding to the recess 3 to extend inclinedly as viewed in the front view of FIG. 2.

The width D9 of the head inserting slot 9 is less than ⅓ of the width D5 of the magnetic tape 5. When a recording/reproducing head (described hereinafter) contacts with the magnetic tape 5 running along the drum surface 8, the air may be introduced between the drum surface 8 and the magnetic tape 5 and, when the width D9 of the head inserting groove 9 is too large the air introduced between the drum surface 8 and the magnetic tape 5 will escape quickly through the head inserting groove 9 which tends to induce vibrations on the magnetic tape 5 running along the drum surface 8 thereby impairing the contact between the recording-/reproducing head and the magnetic tape 5 and causing improper recording or reproducing. In particular, when a magnetic tape 5 runs along a drum surface 8 it is preferable that there is not any air escaping groove, however, according to the invention, since the recording-/reproducing head contacts with the magnetic tape 5 from the outside of the tape cassette it is required to provide the head inserting groove 9, therefore, it is preferred to minimize the width of the head inserting groove 9. Assuming that the width D5 of the magnetic tape 5 is 1.905 mm, the running speed of the tape 5 is 7.21 mm/sec ±0.5%, the diameter of the drum surface 8 is 20 mm, the winding angle of the magnetic tape 5 around the drum surface 8 is 60 degrees, the rotation speed of the recording/reproducing head is 3600 rpm, and the thickness of the tip portion of the recording/re-/producing head is 0.18 mm, then, it has been found that when the width D9 of the head inserting slot 9 is not larger than ⅓ of the width D5 of the tape 5 there is no problem relative to the vibrations of the magnetic tape 5.

Further, it is required that the recording/reproducing head can trace the recording track of the magnetic tape 5 on the surface of the tape 5 exposed to the outside through the head inserting slot 9 both during the running condition and non-running condition of the magnetic tape 5. It has been found that such requirements can be attained, under the above mentioned numerical example, by determining the width D9 of the head inserting slot 9 as 0.4 mm and the angle of inclination of the slot 9 as 5.24 degrees.

In the example above mentioned, the width of the tape 5 is relatively narrow, but the present invention can also be applied to the magnetic tape of relatively wide such as the width D5 is 4 mm. In such case the width D9 of not larger than 1.3 mm can attain good results.

There are formed head escaping grooves 9a and 9a as shown in FIG. 2 in opposite ends of the head inserting slot 9 and in the front wall 7 of the cassette casing 2, whereby the recording/reproducing head can smoothly introduced into and out of the slot 9 without impacting against the cassette casing 2.

There are provided tape guides 10 and 10' in the cassette casing 2 and adjacent to opposite ends of the drum surface 8, and locating openings 10a and 10'a extending through the tape guides 10 and 10' and opening in the upper and lower surfaces of the cassette casing 2.

Guide rollers 11 and 11' are rotatably supported in the cassette casing 2 and are respectively spaced from the tape guide 10 and 10' in the directions separating from the drum surface 8. The guide rollers 11 and 11' have respectively therein connecting openings 11a and 11'a extending the central portions thereof and being exposed to the outside through openings 12, 12 . . . which are formed respectively in the upper and lower surfaces of the cassette casing 2.

And, the magnetic tape 5 is routed from one of the reel hubs 4, sequentially through the guide roller 11 and the tape guide 10, along the drum surface 8, through the tape guide 10' and the guide roller 11', and to the other of the reel hubs 4'.

The axes of the reel hubs 4 and 4', the drum surface 8, the tape guides 10 and 10' and the guide rollers 11 and 11' are parallel to each other and perpendicular to the upper and lower surfaces of the cassette casing 2. Further, the widthwise center line 5a of the magnetic tape 5 is located in a single phantom plane 5b which is perpendicular to the axes of the reel hubs 4 and 4', the drum surface 8, the tape guides 10 and 10', the locating openings 10a and 10'a, and the guide rollers 11 and 11'.

Therefore, the magnetic tape 5 runs along a tape path in the cassette casing 2 not having any difference in the elevation and any twisting, and even though the magnetic tape 5 is moved at a high speed any snaking movement or the flapping movement of the tape can be prevented, which enables high speed accessing.

Recording/Reproducing Apparatus (FIG. 5 through FIG. 9)

Shown at numeral 13 is the recording/reproducing apparatus, and comprises a tape cassette mounting portion and a rotary head portion.

Tape Cassette Mounting Portion

Shown at 14 is a main body of the apparatus 13, and a tape cassette mounting portion 15 is formed on the main body 14.

Shown at numerals 16 and 16' are reel mounting portions rotatably provided in the main body 14 and, are provided respectively reel engaging shafts 16a and 16'a. The reel mounting portions 16 and 16' are driven by suitable drive mechanism not shown in the drawings to rotate in desired directions and at desired speed.

Shown at numerals 17 and 17' are respectively locating pedestals provided in the main body 14 and spaced in the left and right directions, and locating pins 18 and 18' are projecting from the central portions of the upper ends 17a and 17'a thereof.

Figure 5:
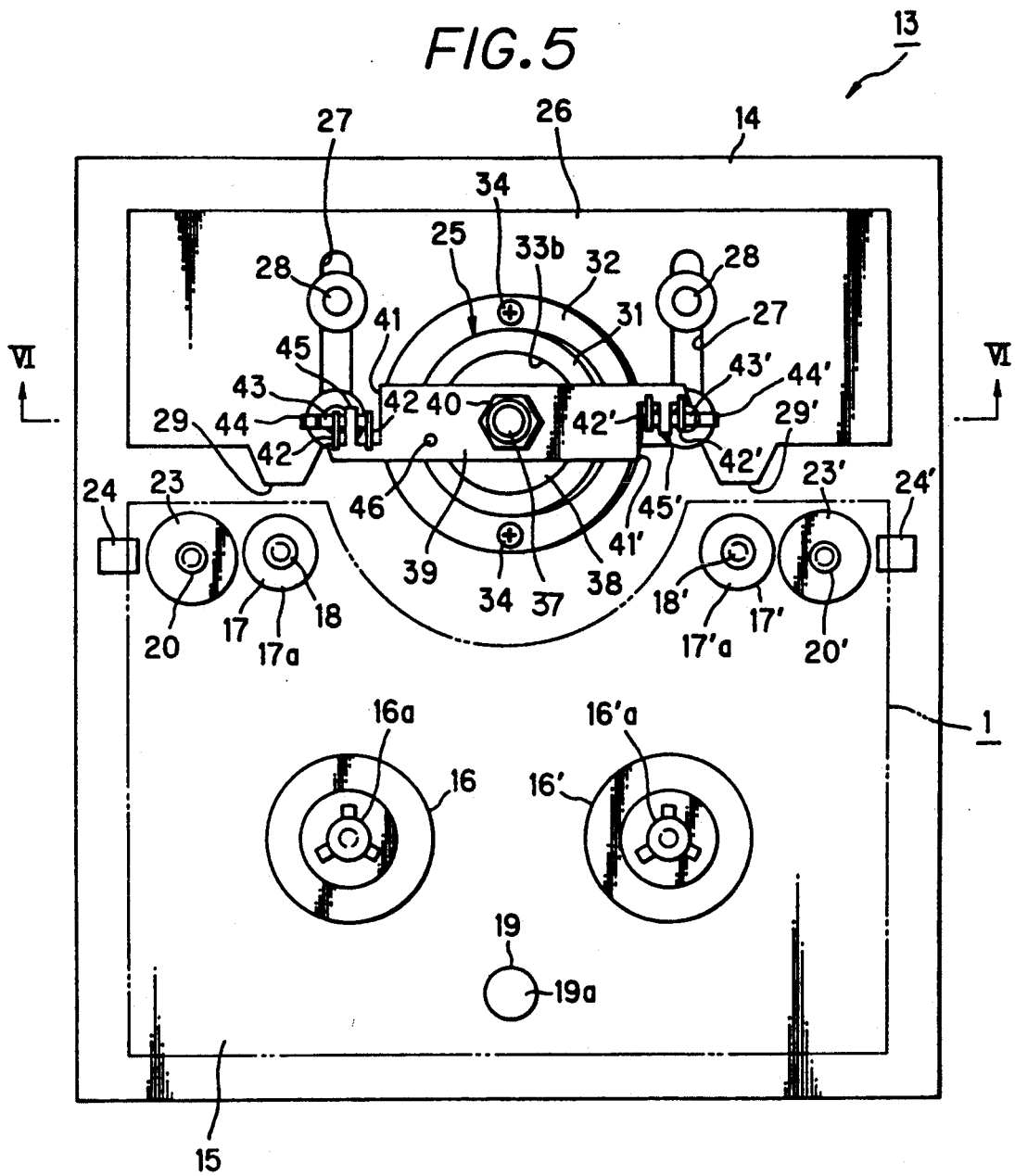
FIG. 5 is a plan view of a magnetic tape recording and/or reproducing apparatus according to a preferred embodiment of the present invention.
Figure 6:
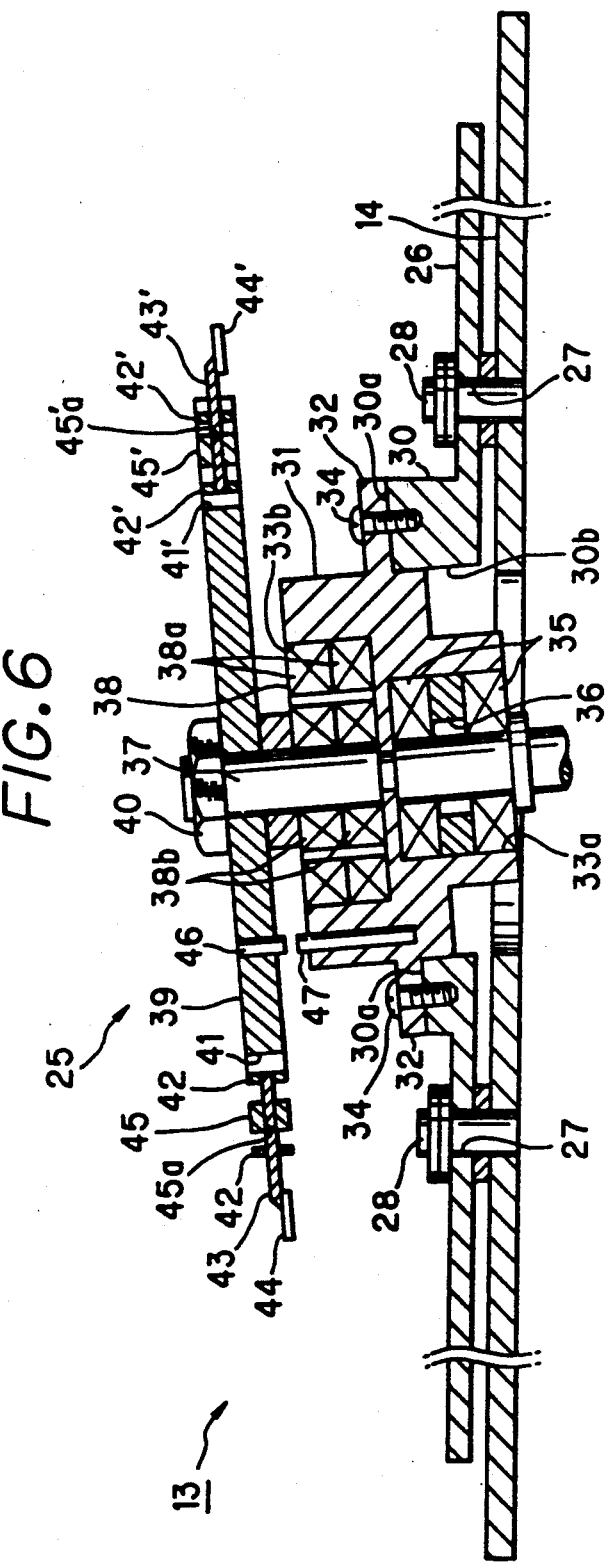
FIG. 6 is an enlarged sectional view taken generally along line VI—VI in FIG. 5.
Figure 9:
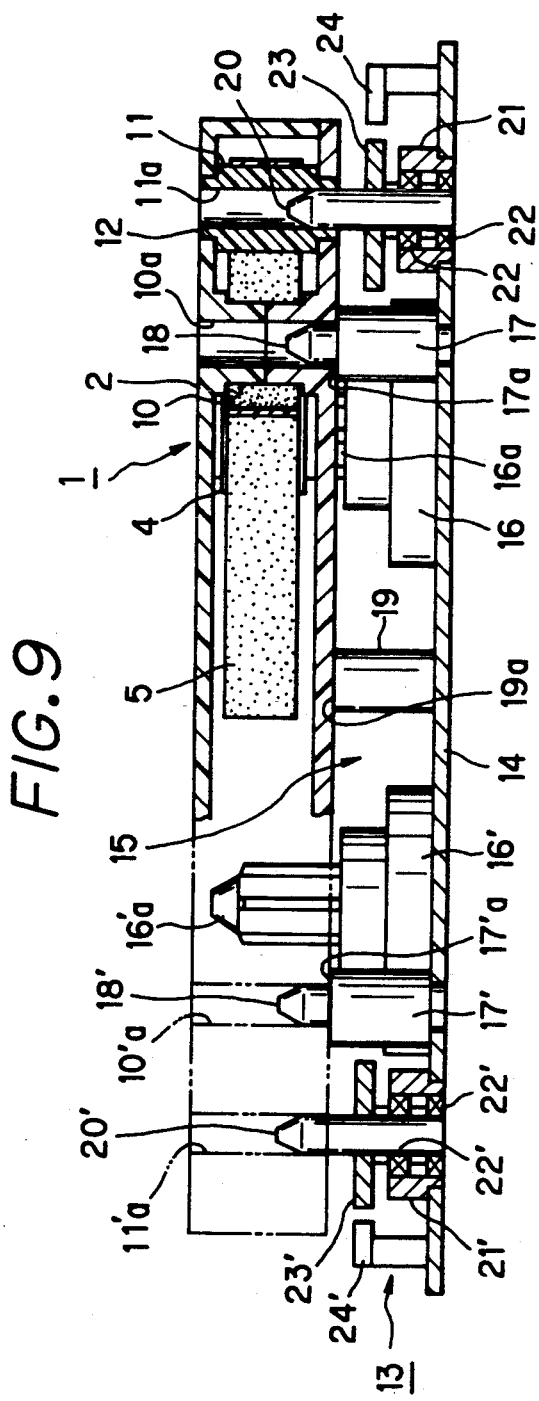
FIG. 9 is a sectional view taken generally along line IX—IX in FIG. 8.
Figure 10:
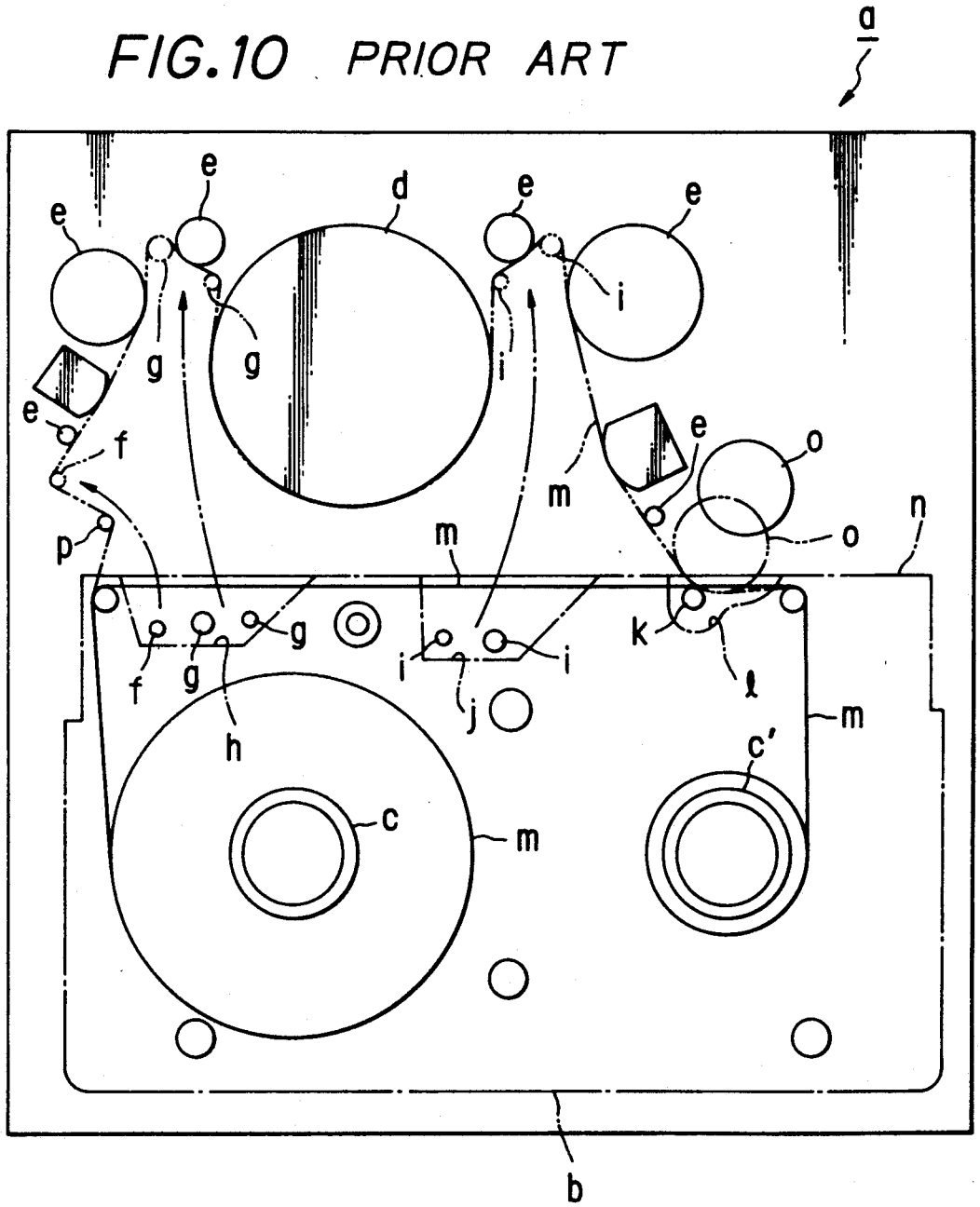
FIG. 10 is a schematic plan view of one example of prior art recording/reproducing apparatus.

Shown at 19 is a locating pedestal provided in the main body 14 and spaced from the locating pedestals 17 and 17' as shown in FIGS. 5 and 9, with the upper end surface 19a and the upper ends 17a and 17'a of the pedestals 17 and 17' defining a single reference plane.

Shown at 20 and 20' are tape speed detecting shafts and are respectively rotatably supported through bearings 22 and 22' on bearing pedestals 21 and 21' which are secured to the main body 14.

Shown at 23 and 23' are respectively so-called magnescales secured to the tape speed detecting shafts 20 and 20' and consist respectively circular discs with the outer circumferential surfaces being magnetized alternately, and with the central portions of the discs being secured respectively to the tape speed detecting shafts 20 and 20' respectively.

Shown at 24 and 24' are magneto-resistance effect elements (MR sensor) disposed respectively adjacent to the outer circumferential surfaces of the magnescales 23 and 23', and the periodic time of the change in the resistance of the MR sensors 24 and 24' caused by the rotation of the magnescales 23 and 23' is detected by a circuit (not shown) and, the running speed of the magnetic tape 5 is obtained therefrom.

When the tape cassette 1 is mounted on the mounting portion 15, the locating pins 18 and 18' of the locating pedestals 17 and 17' are inserted respectively into the locating openings 10a and 10'a in the tape cassette 1, whereby the tape cassette 1 is located in the plan directions. Further, the casing 2 of the tape cassette 1 is mounted on respective upper end surfaces 17a, 17'a and 19a of the locating pedestals 17, 17' and 19, thus, the cassette 1 is located in the vertical directions. The engaging openings 4a and 4'a of the tape reels 4 and 4' of the tape cassette 1 engage respectively with the reel engaging shafts 16a and 16'a of the reel mounting portions 16 and 16', whereby the magnetic tape 5 is moved by the rotation of the reel mounting portions 16 and 16'. Further, the tape speed detecting shafts 20 and 20' are received in respective connecting openings 11a and 11'a of the guide rollers 11 and 11' of the tape cassette 1 such that the rotation the tape speed detecting shafts 20 and 20' caused by the rotation of the guide rollers 11 and 11' accompanied by the movement of the tape 5 will be detected by the magnescales 23 and 23' and MR sensors 24 and 24', and the results of the detection is fed back to the reel driving portion so that the magnetic tape 5 is driven at a predetermined speed.

Rotary Head Portion

Shown at numeral 25 is a rotary head portion having a rotary magnetic head.

Shown at 26 is a sliding base supported slidingly on the main body 14, and is movable toward and separating from the tape cassette mounting portion 15, or in the front and rear directions.

Figure 8:
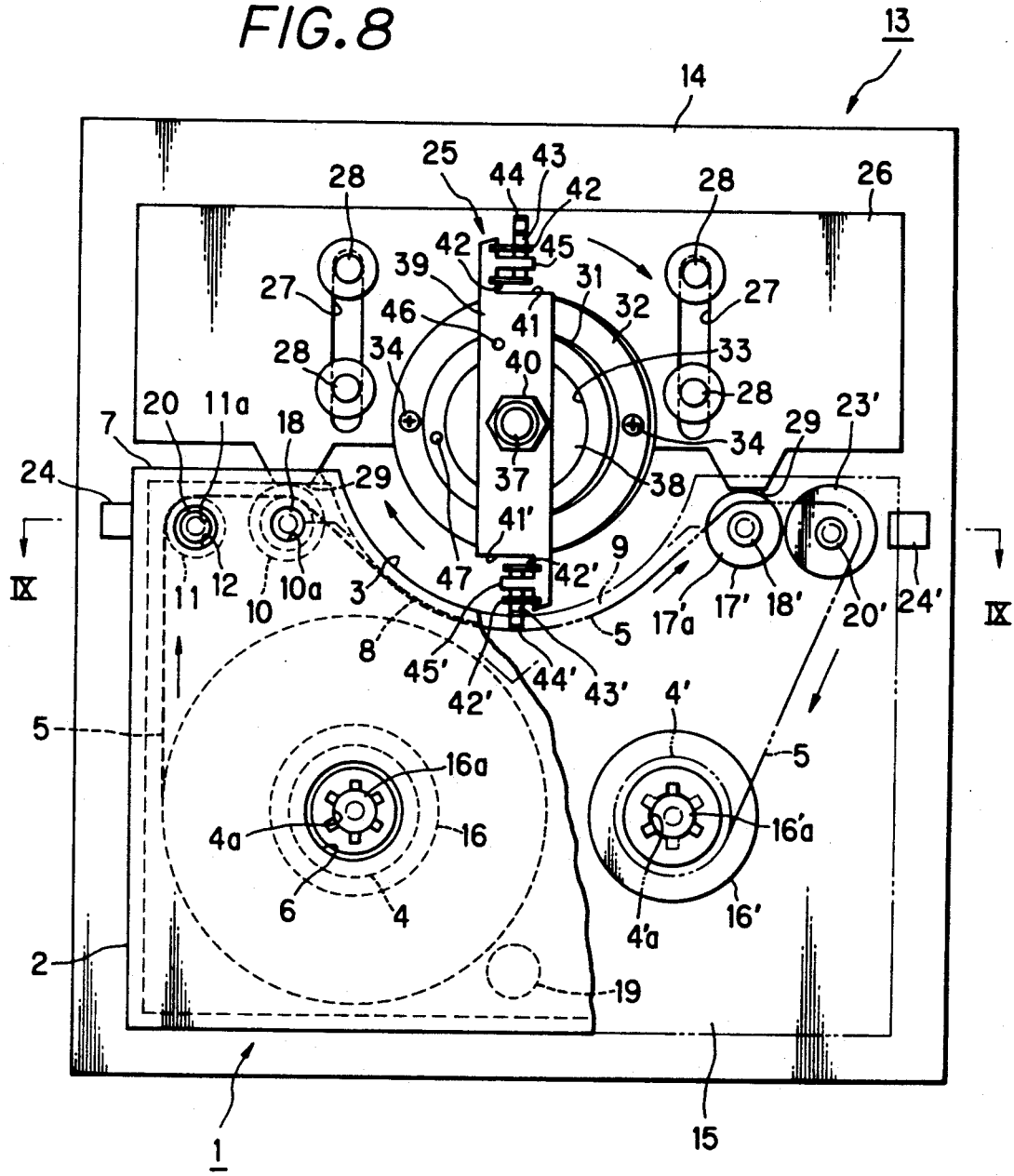
FIG. 8 is a partially broken plan view of the apparatus of FIG. 5, showing the condition when the tape cassette is mounted and a rotary head portion is moved toward the tape cassette mounting portion.

Shown at 27 and 27 are elongated openings formed in the sliding base 26 spaced from each other in the left and right directions and extending respectively in the front and rear directions as shown in FIG. 8. The openings 27 and 27 receives slidingly support pins 28, 29 . . . which are extending from the main body 14 such that the sliding base 26 can slidingly move relative to the main body 4 in the front and rear directions.

Shown at numerals 29 and 29' are abutting edges formed respectively on the sliding base 26 and on a side edge thereof facing the tape cassette mounting portion 15 and spaced from each other in the left and right directions. When the sliding base 26 is moved toward the tape cassette mounting portion 15, the abutting edges 29 and 29' abut respectively with the outer circumferences of the locating pedestals 17 and 17' respectively, thereby locating the sliding base 26 with respect to the tape cassette mounting portion 15.

The sliding base 26 is moved in the front and rear directions by suitable displacing mechanism (not shown). And in recording/reproducing, it is moved toward the tape cassette mounting portion 15, and when the tape cassette is mounted on or removed from the tape cassette mounting portion 15 the sliding base 26 is moved in the direction separating from the tape cassette mounting portion 15.

Shown at numeral 30 is a head support pedestal secured to nearly central portion of the sliding base 26 with the upper surface 30a being inclined and having a large inserting opening 30b.

Shown at numeral 31 is a support housing having a short cylindrical configuration, and being provided integrally with a mounting flange 32 on generally axially central portion thereof to project radially outward.

The support housing 31 defines an opening with the lower half portion 33a of which defining a small diameter bearing support portion and the upper half portion of which defining a large diameter transformer mounting portion 33b.

The support housing 31 is mounted on the head support pedestal 30 with a portion lower of the mounting flange 32 being fitted in the inserting opening 30b of the support housing 30 so that the mounting flange 32 is mounted on the upper surface 30a of the head supporting pedestal 30 and, at this condition, the support housing 31 is secured to the support pedestal 30 by mounting screws 34, 34 . . . . Thus, the support housing 31 is mounted on the sliding base 26 with the axis of the housing 31 being inclined relative to the vertical line by an amount equal to that of the upper surface 30a of the support pedestal 30.

There are supported bearings 35 and 35 in the bearing support portion 33a and, shown at numeral 36 is a spacer interposed between the bearings 35 and 35.

Shown at numeral 37 is a rotary shaft being rotatably supported in the support housing 31 through the bearings 35 and 35, and the upper end thereof projecting upward from the upper end of the support housing 31. Although not shown in the drawings, the lower end of the rotary shaft 37 projects downward of the support housing 31 and, is connected to a driving mechanism.

Shown at numeral 38 is a rotary transformer disposed in the transformer mounting portion 33b in the support housing 31, with a stator 38a thereof being secured to the support housing 31 and a rotor 38b thereof being secured to the rotary shaft 37. The transformer 38 acts to transmit signals between the recording/reproducing head and a circuit not shown in the drawings.

Shown at numeral 39 is a rotary wing with the central portion thereof being secured to the upper end of the rotary shaft 37 by nuts 40.

Figure 7:
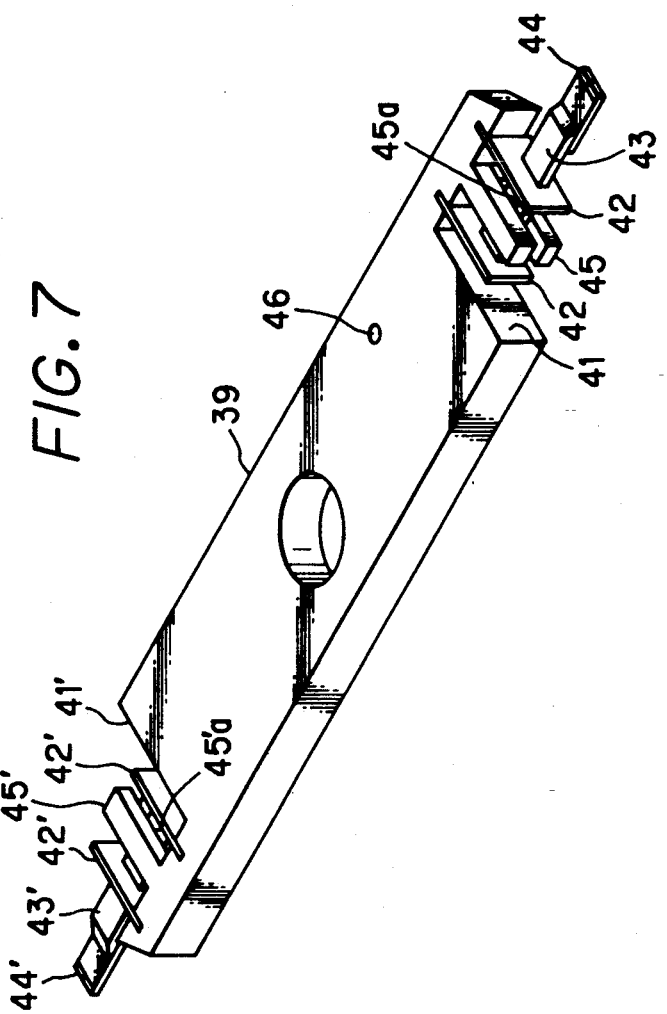
FIG. 7 is an enlarged perspective view of a portion of the apparatus of FIG. 5, on which portion a recording-/reproducing head is supported.

Shown at 41 and 41' are cutouts formed in opposite end portions of the rotary wing 39 as shown in FIG. 7.

Shown at 42, 42 and 42', 42' are head supporting pieces being supported on the rotary wing 39 and in the cutouts 41 and 41' respectively and, with the base end portions thereof being supported on respective radially extending edge portions of the rotary wing 39. The head supporting pieces 42, 42 and 42', 42' extend respectively in the direction perpendicular to the lengthwise direction of the rotary wing 39 and, are formed respectively of a sheet spring material and the thicknesswise direction of which being parallel to the lengthwise direction of the rotary wing 39.

Shown at 43 and 43' are head support assisting plates mounted respectively on the head supporting pieces 42, 42 and 42', 42' to extend in the lengthwise direction of the rotary wing 39 and, recording/reproducing heads 44 and 44' are respectively supported on the tip ends or the radially outer ends of the head support assisting plates 43 and 43' respectively.

Shown at 45 and 45' are regulating pieces projecting respectively from the rotary wing 39 at positions between the head supporting pieces 42 and 42 and between the head supporting pieces 42' and 42' respectively as shown in FIG. 7. The regulating pieces 45 and 45' have respectively slits 45a and 45'a for receiving therein slidably the head support assisting plates 43 and 43' so as to prevent the vibrations thereof in the vertical directions and to control the deflections of the head supporting pieces 41, 41 and 41', 41' in the radial directions.

Shown at numeral 46 is a PG magnet supported on the rotary wing 39, at 47 is a PG coil supported on the supporting housing 31. The PG coil 47 is disposed near to the rotating locus of the PG magnet 46, thereby detecting the rotating speed of the rotary wing 39 so as to enable the servo-control of the rotary wing 39.

Operation

Assuming that the tape cassette 1 is mounted on the tape cassette mounting portion 15 and recording or reproducing order is given, then, the sliding base 26 is moved toward the tape cassette mounting portion 15 until the abutting edges 29 and 29' abut respectively with the outer circumferences of the locating pedestals 17 and 17' and are located, and the locus of the movement of the recording/reproducing heads 44 and 44' are located along the head inserting slot 9 in the tape cassette 1.

When the rotary shaft 37 is rotated, the rotary wing 39 rotates in the arrow direction as viewed in FIG. 8, and the recording/reproducing heads 44 and 44' supported on the opposite ends thereof move along a locus of a circle. The recording/reproducing heads 44 and 44' will receive the centrifugal force due to the rotation of the rotary wing 39 such that the head supporting pieces 42, 42 and 42', 42' will be deflected, and the recording/reproducing heads 44 and 44' will move in the direction separating from the rotary shaft 37 by some amount, whereby the heads 44 and 44' can contact, through the head inserting slot 9, with the magnetic surface of the magnetic tape 5 which is slidingly moving along the drum surface 8 in the arrow direction as viewed in FIG. 8. The reading or writing of the signal from or on the magnetic tape 5 is performed when the recording/reproducing head 44 or 44' is contacting with the magnetic tape 5.

Incidentally, it is also possible to rotate the magnetic tape 5 and the recording/reproducing heads 44 and 44' in the direction opposite to the arrow direction in FIG. 8 so as to perform so-called reverse recording or reverse reproducing operation.

As described heretofore, in the recording/reproducing apparatus 13, it is not required to pull the magnetic tape 5 out of the cassette casing 2 for winding the tape around a head drum and for routing the tape along a predetermined tape path, therefore, it is possible to omit the tape loading mechanism which can simplify the construction very much. Further, the rotary head portion does not include a head drum which requires a highly finished machining accuracy, therefore, it is possible to omit precision assembling operation and which enables to simplify the construction. Further, the path of the tape in recording/reproducing is defined by the drum surface 8 of the tape cassette 2 and by respective guides 10, 10' 11 and 11' or by the construction of the tape cassette 2, thus, it is possible to attain good interchangeability. Further, it is not required to apply so-called tape loading operation for pulling the magnet tape 5 out of the cassette casing 2 and forming a predetermined tape path, thus, it is possible to omit or minimize the access time or the build up time and, the apparatus can be utilized for data processing.

Incidentally, it is possible to adopt so-called non-tracking process, namely, during the reproducing step, the rotary magnetic head is rotated at the speed twice of the speed during the recording so as to read the signals doubly, to store the signal in a memory and to form the signal by arranging in the order same to that during the recording, then, it is advantageous to simplify the servo system largely. It will be understood that the present invention is not limited to such recording/reproducing apparatus of the non-tracking process or to the tape cassette therefor.

Advantages of the Invention

As described heretofore, in the recording/reproducing apparatus according to the present invention, the recording/reproducing operation is performed by the recording/reproducing head scanning helically the magnetic tape received in the tape cassette, and includes a tape cassette mounting portion and a rotary head portion, which portions being adapted to separate and to approach relative to each other. The rotary head portion is provided with a recording/reproducing head being able to project in the radial direction due to the centrifugal force of the rotation, thereby approaching to a tape cassette mounting portion and contacting the magnetic tape running in the tape cassette.

Further, the tape cassette according to the present invention is formed to have a circular arcuate recess as viewed in the plan view in the front wall of the tape cassette. The inner surface of the front wall of the portion being formed to define the recess acts as a drum surface of a circular arcuate shape along which the tape contacts and slidingly moves. The portion forming the drum surface has an inclined head inserting slot. The recording/reproducing head can be inserted through the head inserting slot to contact with the tape received in the tape cassette.

Accordingly, the recording/reproducing apparatus and the tape cassette of the present invention enable to omit the complicated tape loading mechanism which pulls the tape out of the tape cassette and locates it along a predetermined path around a head drum, thereby the construction can be simplified substantially. Further, since the recording/reproducing head is not provided on the head drum on which the tape is wound it is possible to simplify substantially the construction of the head and to elongate the service life of the head. Further, the path of the tape during the recording/reproducing operation is solely defined by the tape cassette in which the tape is received, the interchangeability is superior, and since the tape path is formed in the tape cassette it is possible to omit the tape pulling out process which can minimize the access time or the build up time, and the apparatus can be utilized in data processing.

In the embodiment, the rotary head portion displaces toward and from the tape cassette mounting portion, but, it will be understood that the tape cassette mounting portion may be moved toward and from the rotary head portion or that both of the rotary head portion and the tape cassette mounting portion may be displaced relative to a stationary housing.

It will be appreciated by persons skilled in the art that the present invention is not limited to what has been particularly shown and described hereinabove, and that various changes and modifications can easily be applied without departing from the spirit and the scope of the present invention which are defined clearly by the claims.

I claim:

1. A magnetic tape recording and/or reproducing apparatus comprising:
   cassette supporting means for mounting thereon a tape cassette having reels and a magnetic tape wound on said reels and being movable therebetween;
   rotary head supporting means including means deflectable when subjected to a centrifugal force;
   a recording and/or reproducing head mounted on said deflectable means; and
   means mounting said cassette supporting means and said rotary head supporting means for relative movements towards and away from each other between an operative position in which said head can contact a moving magnetic tape in a tape cassette on said cassette supporting means when said deflectable means is deflected in response to said centrifugal force arising due to rotation of said rotary head supporting means, and an inoperative position in which said rotary head supporting means is relatively remote from said cassette supporting means.

2. A magnetic tape recording and/or reproducing apparatus according to claim 1, wherein said rotary head supporting means further includes means for controlling the amount of deflection of said deflectable means.

3. A magnetic tape recording and/or reproducing apparatus according to claim 2, further comprising at least one additional recording and/or reproducing head mounted on said deflectable means such that, when said cassette supporting means and said rotary head supporting means are in said operative position and said rotary head supporting means is rotating, at least one of said heads can contact the moving magnetic tape in the tape cassette.

4. A magnetic tape recording and/or reproducing apparatus according to claim 1, further comprising at least one additional recording and/or reproducing head mounted on said deflectable means such that, when said cassette supporting means and said rotary head supporting means are in said operative position and said rotary head supporting means is rotating, at least one of said heads can contact the moving magnetic tape in the tape cassette.

5. A tape cassette comprising a casing containing a tape which is movable therein and including a front wall having a portion with a circularly arcuate recess formed therein, an inner surface of said portion of said front wall defining an arcuate drum surface contacted by the tape and along which the tape slides, and said portion of the front wall forming the drum surface having a slot therein adapted for the insertion therethrough of a recording and/or reproducing head for contact with the tape.

6. A tape cassette according to claim 5, in which said slot extends circumferentially in an inclined manner.

7. A tape cassette according to claim 6, in which the tape cassette further includes reel hubs on which the tape is wound and at least one tape guide for guiding the tape along a predetermined path, and in which said drum surface, said reel hubs and the at least one tape guide have respective axes which are parallel to each other.

8. A tape cassette according to claim 6, in which said tape cassette further includes grooves adapted for allowing the recording and/or reproducing head to be inserted into and removed from the slot, said grooves being located at opposite longitudinal ends of the slot.

9. A tape cassette according to claim 8, in which the tape has a recording track which is located adjacent to said slot when the tape is moving and when the tape is in a stationary position.

10. A tape cassette according to claim 6, in which the tape has a recording track which is located adjacent to said slot when the tape is moving and when the tape is in a stationary position.

11. A tape cassette according to claim 5, in which the tape and the slot have respective widths and in which the width of the slot is at most ⅓ of the width of the tape.

12. A tape cassette according to claim 5, in which the tape cassette further includes reel hubs on which the tape is wound and at least one tape guide for guiding the tape along a predetermined path, and in which said drum surface, said reel hubs and the at least one tape guide have respective axes which are parallel to each other.

13. A tape cassette according to claim 5, in which said casing of the tape cassette further includes grooves adapted for allowing the recording and/or reproducing head to be inserted into and removed from the slot, said grooves being located at opposite longitudinal ends of the slot.

14. A tape cassette according to claim 5, in which the tape has a recording track which is located adjacent to said slot when the tape is moving and when the tape is in a stationary position.

* * * * *